US008325604B1

United States Patent
Bashan et al.

(10) Patent No.: US 8,325,604 B1
(45) Date of Patent: *Dec. 4, 2012

(54) COMMUNICATION SYSTEM AND METHOD FOR MEDIA ACCESS CONTROL

(75) Inventors: Erez Bashan, Atlanta, GA (US); Erez Izenberg, Tel-Aviv (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/084,392

(22) Filed: Apr. 11, 2011

Related U.S. Application Data

(63) Continuation of application No. 10/783,472, filed on Feb. 20, 2004, now Pat. No. 7,924,870.

(30) Foreign Application Priority Data

Feb. 20, 2003 (IL) .......................................... 154560

(51) Int. Cl.
*H04J 1/16* (2006.01)
*H04L 12/56* (2006.01)

(52) U.S. Cl. ........ 370/230; 370/235; 370/386; 370/431; 370/486

(58) Field of Classification Search .................. 370/486, 370/431, 230, 235, 386
See application file for complete search history.

(56) References Cited

U.S. PATENT DOCUMENTS

| | | | |
|---|---|---|---|
| 5,452,115 A | 9/1995 | Tomioka | |
| 5,978,374 A | 11/1999 | Ghaibeh et al. | |
| 5,987,549 A | 11/1999 | Hagersten et al. | |
| 6,137,793 A | 10/2000 | Gorman et al. | |
| 6,317,234 B1 | 11/2001 | Quayle | |
| 6,445,702 B1 | 9/2002 | Wright | |
| 6,614,759 B1 | 9/2003 | Lee et al. | |
| 6,898,755 B1 * | 5/2005 | Hou | 714/784 |
| 7,200,144 B2 | 4/2007 | Terrell et al. | |
| 7,209,659 B2 | 4/2007 | Munter | |
| 2004/0028405 A1 * | 2/2004 | Unitt et al. | 398/32 |

* cited by examiner

*Primary Examiner* — John Pezzlo

(57) ABSTRACT

A system and method for upstream transmission and the media access control of upstream transmission of groups of fixed sized cells, such as ATM cells in a point to multipoint optical network, such as a passive optical network. The upstream media access control scheme is responsive to grouping information reflecting a parameter of a group of fixed sized cells. The parameter may reflect the length of the relevant payload of the group the fixed sized cells.

20 Claims, 12 Drawing Sheets

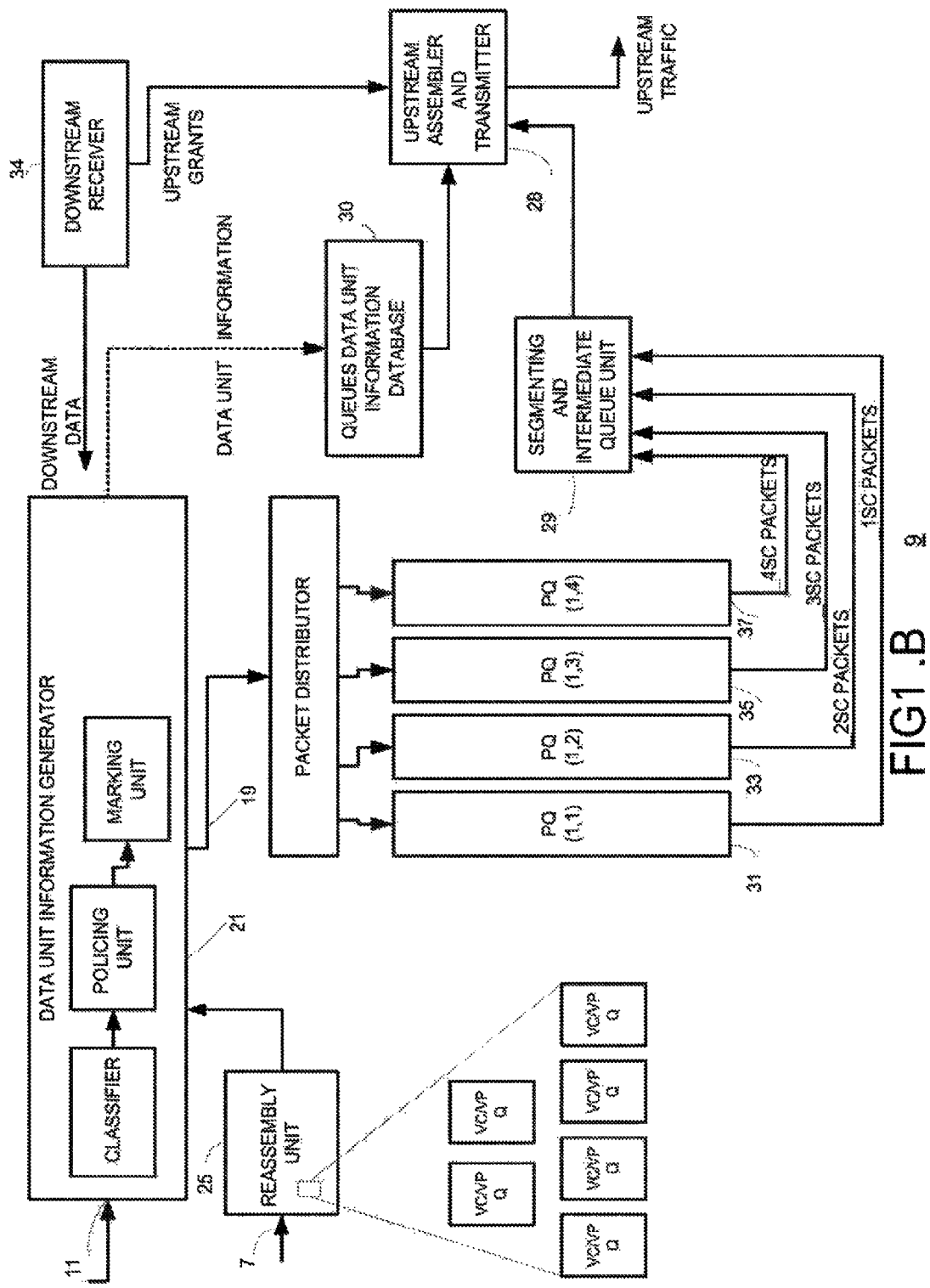
FIG1.B

COMMUNICATION SYSTEM AND METHOD FOR MEDIA ACCESS CONTROL

RELATED APPLICATION

The present application is a continuation of U.S. application Ser. No. 10/783,472, filed Feb. 20, 2004, which claims the priority benefit of and incorporates by reference Israeli Patent Application 154560, filed Feb. 20, 2003. The disclosures of the applications referenced above are incorporated herein by reference

FIELD OF THE INVENTION

The present invention relates to communication systems and methods in general, and to methods and systems for media access control of a shared communication media. Even more particularly, to methods and systems for controlling upstream transmission of a point to multipoint optical network. The invention is applicable to, but not limited to, point to multipoint passive optical networks.

BACKGROUND OF THE INVENTION

Optical access networks, such as point to multipoint optical access networks are known in the art. ITU-T Recommendation G.983.1 defines an access network that utilizes optical fiber technology to convey point to multipoint downstream traffic from an headend such as an Optical Line Termination (OLT) to multiple network units such as Optical Network Units (ONUs) or Optical Network Terminations (ONTs) and to convey point to point upstream traffic from an ONU or ONT to the OLT.

An ONU provides, either directly or remotely, the user-side interface of the Optical Access Network (OAN).

An OLT provides the network side interface of the OAN and is connected to at least one Optical Distribution Network (ODN).

An ODN provides the optical transmission means between the OLT and the ONUs. An ODN usually includes passive optical components such as optical fibers, optical connectors, passive branching components, passive optical attenuators and splices.

The optical access network supports Asynchronous Transfer Mode (ATM) based data transmission. ATM based data transmission allows to support more than a single class of service. When a packet, such as but not limited to Internet Protocol (IP) packet, is received at an ATM supporting network, it is segmented to provide a group of at least one ATM cell. Each ATM cell is routed across the ATM based network. Before exiting the ATM based network the IP packet is reassembled from the at least one ATM cell.

Each ATM cell is 53 bytes long and includes a 7-byte header and 48-byte payload. The ATM header is utilized for routing ATM cells across the ATM based network.

As multiple network units, such as ONUs or ONTs share the same media, the OLT controls upstream transmission, by assigning upstream timeslots by implementing a Media Access Control (MAC) scheme. According to the ITU-T Recommendation G.983.4 upstream bandwidth may assigned in two manners—(a) in response to the utilization of upstream bandwidth by each of the ONUs, and (b) in response to upstream status reports from the ONUs or ONTs. More specifically, each ONU (or ONT) can include at least one Transmission Container (T-CONT), each T-CONT has at least one queue. An ONU reports the queue length of T-CONTs that belong to him. Usually, a single T-CONT has more than a single queue, each queue associated with a distinct class of service. Accordingly, the aggregate queues length of that TCONT is reported.

An ONU (or ONT) can selectively report the T-CONTs queue length by various manners. For example, An ONU (or ONT) can report the queues lengths from the most congested T-CONT, from each T-CONT in turn equally, but this is not necessarily so. These reports are transmitted upstream in mini-slots assigned by the OLT.

Upstream traffic is arranged in an upstream frame of 53 timeslots. Each timeslot consists of three-bytes of PON layer overhead and either an ATM cell or a PLOAM cell.

The OLT allocates upstream bandwidth on a timeslot to timeslot basis, according to the T-CONTs queue length and then transmits downstream data grants in downstream PLOAM cells. Assuming that the upstream and downstream bit rate are the same, then during a frame of 53 timeslots, two PLOAM cells are utilized for providing 53 data grants, corresponding to the 53 timeslots within each upstream frame. When the upstream data rate is much smaller than the downstream data rate, some PLOAM cells are empty.

The T-CONTs are classified to five types, each type is characterized by an assigned bandwidth out of the following five assigned bandwidth types: (i) fixed bandwidth, (ii) assured bandwidth, (iii) non-assured bandwidth, (iv) best effort bandwidth, and (v) maximum bandwidth. It is noted that the first four assigned bandwidths are listed according to their priority, starting with the highest priority assigned bandwidth. Accordingly, the assignment of bandwidth starts by assigning bandwidth to fixed bandwidth. The assignment limits the amount of cell transfer delay and delay variation. Assured bandwidth is assigned using the remaining bandwidth. Assured bandwidth means that a predefined average (long-range) bandwidth is assigned. It is noted that the amount of allocated bandwidth per frame can fluctuate. The yet remaining bandwidth (also referred to as surplus bandwidth) is utilized for the lower priority bandwidth assignments such as the non-assured bandwidth and the best effort bandwidth.

A type 1 T-CONT is characterized by fixed bandwidth only. Bandwidth is allocated to a type 1 T-CONT regardless of whether its queues are empty or not. A type 2 T-CONT is characterized by assured bandwidth only.

A type 3 T-CONT is characterized by assured bandwidth and non-assured bandwidth. A type 3 T-CONT shall be allocated bandwidth equivalent to its Assured bandwidth, only when it has cells at a rate equivalent to Assured bandwidth or more than Assured bandwidth. Non-assured bandwidth shall be allocated across T-CONTs with Assured bandwidth, and by requesting surplus bandwidth in proportion to the Assured bandwidth of the individual T-CONT on the PON, e.g., Weighted Round Robin method, as surplus bandwidth. The sum of the assured bandwidth and non-assured bandwidth allocated to this T-CONT should not exceed its maximum bandwidth, which is pre-provisioned.

A type 4 T-CONT is characterized by best effort bandwidth only and does not have any guaranteed bandwidth. A type 4 T-CONT shall only use bandwidth that has not been allocated as fixed bandwidth, assured bandwidth and non-assured bandwidth to other T-CONTs sharing the same upstream bandwidth. Best-effort bandwidth is allocated to each type 4 T-CONT equivalently, e.g., based on Round Robin method, up to their predefined maximum bandwidth.

A type 5 T-CONT is the super set of type 1-type 4 T-CONTs. Accordingly they can be characterized by at least one of the following assigned bandwidths: fixed bandwidth, assured bandwidth, non-assured bandwidth and best-effort bandwidth. It is noted that the bandwidth allocation cannot exceed the maximum bandwidth of the T-CONT.

It is noted that a T-CONT may have a priority control mechanism and/or an internal schedule that are operable to determine from which class of service queue to transmit an ATM cell in response to a data grant.

It is further noted that each assigned bandwidth type may be associated with its own class of service. Accordingly, the five mentioned above type of bandwidth assignment are associated with five class of service.

U.S. Pat. No. 5,926,478 of Ghaibeh et al. titled "Data transmission over a point-to-multipoint optical network" describes a data transmission protocol for use in an ATM based point-to-multipoint passive optical network interconnecting a headend facility and a plurality of network units. The headend facility controls the upstream transmission from the network units in response to ATM cell queue sizes at the network units and in response to a selected set of service priorities. A network unit can include various queues, such as a CBR queue, a VBR queue and a ABR queue. The sizes of these queues are included within an upstream bandwidth request.

Downstream data is transmitted in serial data frames comprising one hundred eighty, fifty-four byte downstream slots, including two framing slots and one hundred seventy-eight ATM cell slots. Each downstream frame slot includes a one byte MAC overhead header field for transmitting upstream transmission permits allocated over twenty bit permit fields, for a total of seventy-two upstream permits allocated per downstream frame. The downstream frames are transmitted every 125.mu.sec for an overall downstream bit rate of 622.08 Mbps. Upstream data is transmitted from an individual network units in five hundred forty bit upstream data slots, each upstream slot having a preamble portion and a payload portion, i.e., with seventy-two upstream slots are transmitted every 125.mu.sec, thereby forming upstream frames received at the headend at a data rate of 311.04 Mbps.

End users negotiate with service providers to determine a class of service or service level. A service Level Agreement (SLA) defines traffic parameters from the end-user, throughout at least one network that interconnect the end-user with other end-users or with other service providers. The traffic parameters include overall delay, delay fluctuations, bandwidth allocation and the like. Many users generate and receive variable length packets, such as Internet Protocol (IP) packets. In such cases the SLA relates to the transmission of IP packets, and does not necessarily comply with the transmission and routing of ATM cells originating from the IP packets.

The size of the IP packet is smaller then the aggregate size of ATM cells the originate from the IP packet, as a header of 7 bytes is added to each 48 bytes of IP packet. Assuming that the size of the IP network is $S1=A*48+B$, then the aggregate size of the ATM cells that originate from the IP packet (S2) equals: $S2=53*(trunc\ (S1/48\ byte)+1)=53*(A+1)$. It is noted that the $(A+1)$'th ATM cell includes B bytes originating from the IP packet and $(48-B)$ "stuffing" bytes. The utilization of the ATM network equals $S2/S1$. S1 is also referred to as the length of the relevant payload and $(S2-S1)$ is also referred to as the overhead signals. ATM network arbitration and scheduling schemes are based upon the overall aggregate size of ATM cells (including header and stuffing bit) that are stored within queues, and not according to the aggregate "net" payload of the cells and neither upon the length of each group.

Furthermore, ATM policing schemes, such as RED or WRED schemes that determine when to discard incoming traffic in response to various parameter such as traffic load are also cell oriented. Accordingly, most of the ATM cells originating from the same IP packet can be routed across an AT1VI network just to see that one ATM cell was discarded, thus all the ATM cells must be re-routed across the network.

As ATM cells are routed on a cell to cell basis, in the presence of ATM cells from many sources, consecutive cells originating from the same IP packet are not routed in a consecutive manner, thus increasing the overall delay and the delay jitter across the ATM network, and require extensive allocation of memory resources.

There is a need for a system and method for improved bandwidth utilization.

There is a need for a system and method for a media access control method and controller that are based upon relevant payload.

There is a need for a system and method and for allowing the routing of ATM cell groups.

SUMMARY OF THE PRESENT INVENTION

The invention provides a communication system that includes an optical communication network, interconnecting a headend and a plurality of network units; wherein the headend has a media access controller for issuing data grants and grouping information requests; wherein a data grant being issued at least partially in response to previously received grouping information. At least some network units out of the plurality of network units are operable to: (i) receive data to be upstream transmitted to the headend (ii); upstream transmit grouping information associated with the received data (iii); and upstream transmit data to the headend in response to data grants issued by the media access controller.

A data grant authorizes an identified network unit out of the plurality of network units to upstream transmit a group of consecutive data cells during at least one consecutive timeslot.

According to an aspect of the invention the optical communication network is a passive optical network, the headend is an OLT and the network units are ONTs and/or ONUs but can also be T-CONTs. A single ONT or a single ONU can include a variety of T-CONTs. Conveniently, the communication network is ITU-T Recommendation G.983.4 compliant, and includes a segmentation are reassembly units for converting IP packets to groups of ATM cells. Preferably, a group of ATM cells originate from a single IP packet, and the grouping information reflects the length of the IP packet.

The media access controller can include a plurality of arbitrators. Each arbitrator may be associated with a class of service out of a plurality of class of services. The class of services may include: provisioned bandwidth, guaranteed bandwidth, assured bandwidth and non-assured bandwidth, but may also include at least one of the following class of services: provisioned bandwidth, minimum latency, assured bandwidth, non-assured bandwidth, minimum drop and minimum jitter. An arbitrator that is associated with a certain class of service is operable to arbitrate between transmission requests from queues of the same class of service, but this is not necessarily so, as a single arbitrator may also be operable to arbitrate between queues of distinct class of service.

The headend is operable to transmit data to network units in consecutive frames; wherein each frame further includes at least one data grant. Each frame may further include a grouping information request. Usually, each frame includes a plurality of fixed length slots.

The invention provides a system wherein grouping information includes grouping information units. A grouping information unit may represent a parameter of a group of data cells that are stored in a queue within a network unit. Conveniently, each group of data cells may include relevant payload and overhead signals. Preferably, a grouping information unit reflects the length of the relevant payload. It is further noted that the queue may store a packet, whereas the segmentation of a packet to at least one cell occurs only after the upstream transmission is approved.

The invention provides a system wherein the media access controller is operable to determine an amount of grouping information to be sent from a network unit. The determination may be is responsive to grouping information previously transmitted from the network unit and to a data threshold, but can also be responsive to an estimation of grouping information relating to information that is yet to sent upstream from the network units. The data threshold conveniently reflects a maximal amount of data that can be upstream transmitted from the network unit to the headend during a predefined time period. Conveniently, the predefined time period equals a MAC cycle, of an upstream frame period.

The invention provides a system wherein at least some of the network units are not operable to generate grouping information. In such a case the media access controller estimates grouping information relating to data from said network units.

The invention provides a system wherein at least some network units out of the plurality of network units include (i) a first input port for receiving variable length data packets and (ii) a segmenting and grouping information unit that is operable to (ii.a) segment a received variable length data packet to provide a group of fixed sized data cells, and to (ii.b) generate grouping information reflecting a parameter of the group of fixed sized cells. Conveniently, the at least some network units further include a classifier, for classifying incoming data packets in response to their service of class. Preferably, the variable length data packets are Internet Protocol packets and the fixed sized cells are Asynchronous Transfer Mode cells.

The invention provides a system wherein at least some network units out of the plurality of network units include (i) a second input port for receiving fixed sized cells, and (ii) an assembly unit for grouping the fixed sized cells to fixed sized cell groups. Conveniently, the at least some network unit further include at least one of the following units: (iii) a grouping information generator, for generating grouping information representative of a parameter of an group of fixed sized cells, or (iv) a grouping information extractor, for extracting grouping information embedded within the group of fixed sized cells.

The invention provides a system wherein the media access controller is operable to provide data grants in response to at least one arbitration scheme. Conveniently, each arbitrator arbitrates between transmission requests of the same class of service. Issued transmission requests are queued and are selectively fetched from the queues to be downstream transmitted to the network units. Preferably, one arbitrator, such as a type 1 T-CONT arbitrator, allocates data grants in a fixed manner. Another arbitrator allocates data grants in response to grouping information, to a transmission current credit, and to a class of service rules, such as bandwidth allocation rules of type 2-5 T-CONTs.

The invention provides a media access controller for controlling an access of a plurality of network units to a shared upstream channel, the media access controller being coupled to a receiver, for receiving grouping information from the plurality of network units. Grouping information reflects at least one parameter of fixed sized cell groups to be upstream transmitted over the shared upstream channel. The media access controller includes: (i) at least one arbitration unit, coupled between the receiver and a grant allocator, for arbitrating between requests to upstream transmit fixed sized cell groups; and (ii) a grant allocator, for selecting data grants authorizing an upstream transmission of a group of fixed sized cells in response to the arbitration. Conveniently, the grant allocator is operative to receive allocated data grants from the at least one arbitrating unit and to select data grants in response to a predefined priority between the at least one arbitration unit. The priority is usually dependent upon the class of service. For example, the bandwidth allocation starts by allocating bandwidth (e.g.—selecting transmission requests) of type 1 T-CONTs, and ends by allocating bandwidth to type 4 T-CONTs.

The invention provides a method for allocating upstream bandwidth of a shared upstream channel of an optical network, the optical network interconnecting a headend with a plurality of network units, the method including the steps of:

Determining grouping information to be upstream transmitted from at least one network unit.

Receiving upstream transmitted grouping information.

Issuing data grants authorizing an identified network unit to transmit upstream data in response to previously received grouping information.

Conveniently, the step of issuing includes the steps of: arbitrating between requests to transmit groups of fixed sized data cells; allocating data grants in response to the arbitrating; and selecting between the allocated data grants.

Conveniently, the step of arbitrating including performing at least two arbitration cycles; and wherein the step of selecting is responsive to a predefined priorities assigned to arbitration cycles.

BRIEF DESCRIPTION OF THE DRAWINGS

The present invention will be understood and appreciated more fully from the following detailed description taken in conjunction with the drawings in which:

FIGS. 1A-1B are schematic illustration of network units, in accordance with embodiments of the invention;

DETAILED DESCRIPTION OF PREFERRED EMBODIMENTS

Figure 1A:
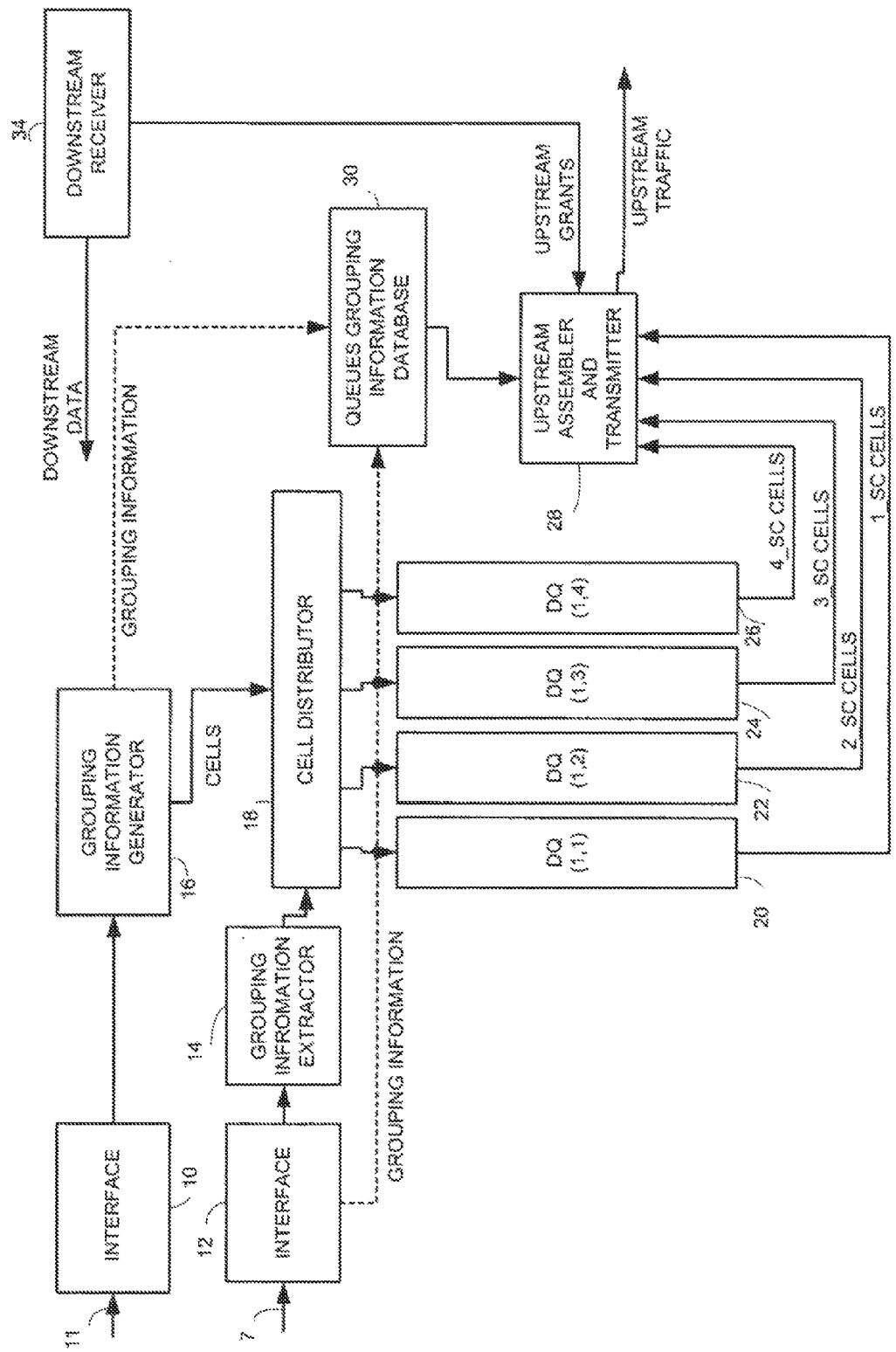

Reference is made to FIG. 1A, which is a schematic illustration of a network unit NU 8, in accordance with an embodiment of the invention. Network unit can be an ONU or an OLY but this is not necessarily so.

Figure 2:
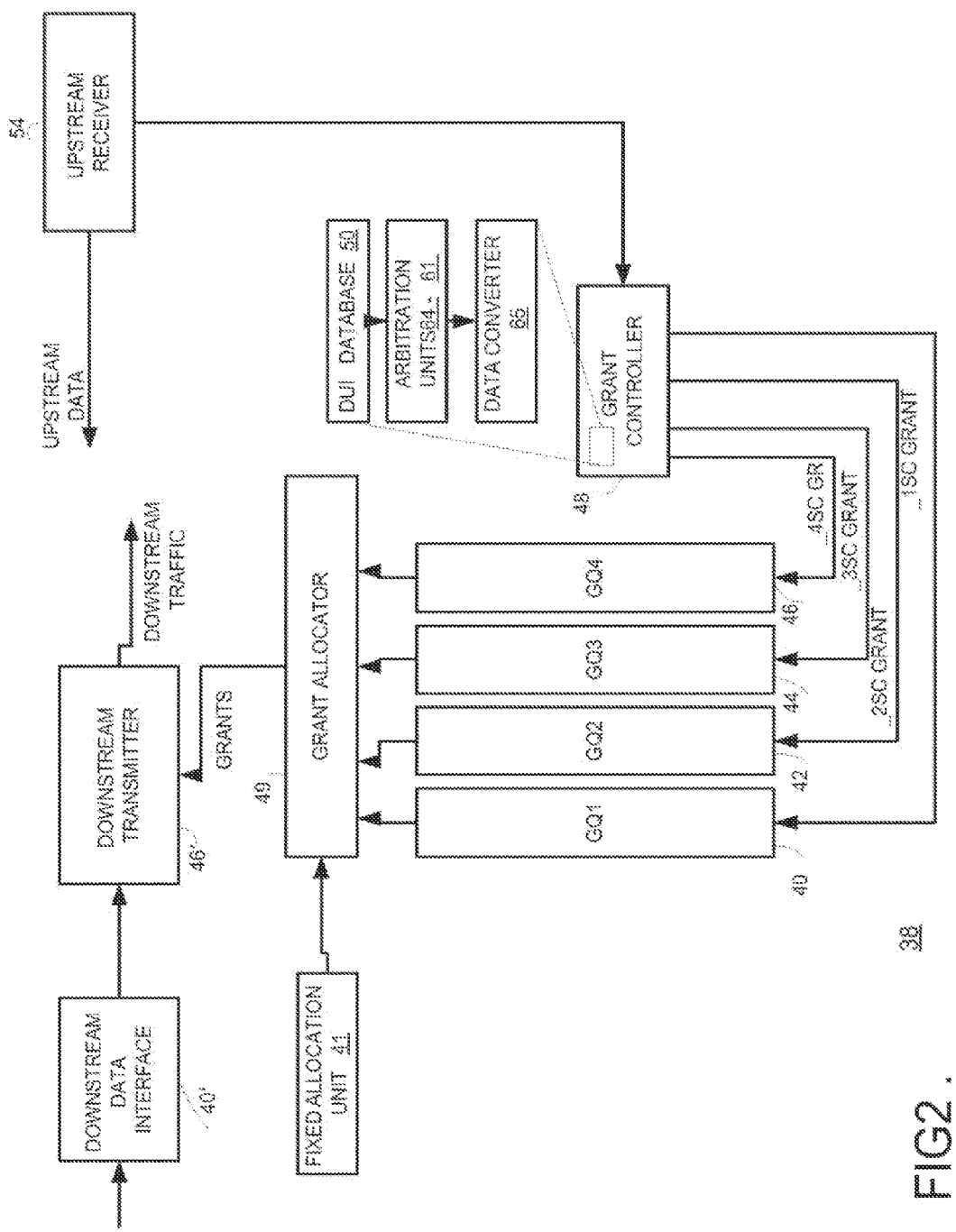
FIG. 2 is a schematic illustration of a headend, in accordance with an embodiment of the invention.

It is noted that although the arbitration schemes depend at least partially upon grouping information, and not upon queues length, queues are still the elementary unit for exchanging information. Furthermore, a headend emulates the group of cell within each queue. Accordingly, the logical and even physical location of a queue, and especially the division between T-CONTs, ONUs and ONTs is of minor significance. For convenience of explanation it is assumed that each network unit is an ONU, that each ONU has four queues, a queue for each class of service, and that classes of service that are manageable without grouping information (such as type 1 T-CONTS) are not illustrated. Furthermore, a group of queues within an ONU, an ONT or T-CONT can be viewed by the OLT as a single queue, as long as the ONU, ONT or TCONT has a mechanism for determining from which of its queues to fetch a group of cells in response to data grants. If is further assumed, for convenience of explanation, that a single headend, such as headend 38 of FIG. 2, is coupled, via a passive optical network, to thirty two NUs such as NU 8 of FIG. 1A or 1B. Media access control may not be based upon grouping information when the bandwidth is allocated regardless the presence or the parameters of data (such as in the case of type 1 T-CONT queues) or in the case of NUs that are not operable to report grouping information.

NU 8 is operable to receive two kinds of data streams via interfaces 10 and 12. It is assumed that the upstream and downstream traffic are arranged as ATM cells, although a man skilled in the art will appreciate that other communication protocols may utilized.

Interface 10 is operable to receive via input port 11 data streams that are not associated with grouping information. Interface 12 is operable to receive via input port 7 data streams that are associated with grouping information. The grouping information can be embedded within the data streams. Grouping information indicates that a group of at least one ATM cells (usually having the same Virtual Circuit and Virtual Pointer values) are to be routed as a group, preferably during consecutive upstream slots. A group of ATM cells may be generated by segmenting a single IP packet, but this is not necessarily so. The grouping information may reflect various parameters of the group of ATM cells, such as aggregate "net" ATM payload size (e.g.—not including "idle" or stuffing signals), amount of ATM cells and/or a ratio between the "net" ATM payload and the aggregate size of the ATM cells of the group. It is noted that other parameters may be provided.

It is assumed, for convenience of explanation that the grouping information reflects the aggregate "net" AT1VI payload size. The aggregate size of the ATM cells of a group equal 53*(ft-um {aggregate "net" ATM payload size/48 byte}+1).

It is noted that the grouping information can be compressed by implementing various compression schemes, such as lossless compression schemes, lossy compression schemes, including quantization schemes, Haffman encoding and the like. Interface 10 provides incoming data streams, such as data streams that include ATM cells that are not AAL5 compliant (e.g.—they do not include grouping information such as IP packet length) to grouping information generator 16 that is operable to: (a) generate ATM cells, (b) generate grouping information associated with the ATM cells, and (c) determine the class of service of the ATM cells. It is noted that the determination is usually based upon the source of the data stream/input port from which the data stream was received. Grouping information generator 16 then sends the grouping information to a queues grouping information database, determines the IP packet class and provides the ATM cells to cell distributor 18 which distributes the ATM cells among data queues DQ(1,1)-DQ(1,4) 20-26 according to their class of service. ATM cells of the first class of service are stored at DQ(1,1) 20, ATM cells of the second class of service are stored at DQ(1,2) 22, ATM cells of the third class of service are stored at DQ(1,3) 24, and ATM cells of the fourth class of service are stored at DQ(1,4) 26. It is noted that the amount of queues and the allocation of ATM cells among the queues can be adjusted to support various class of services and various arbitration schemes, including hierarchical arbitration schemes and the like.

If, for example, the incoming data streams are ATM data streams that include ATM cells that were generated from IP packets but are not associated with grouping information then grouping information generator 16 reassembles IP packets from the ATM cells, generates grouping information reflecting the size of the IP packet, segments the IP packets to ATM cells, provides the grouping information to queues grouping information database 30, determines the ATM cell class of service, and provides the ATM cells to cell distributor 18 which distributes the ATM cells among data queues DQ(1,1)-DQ(1,4) according to their class of service. Conveniently, the grouping information is also embedded within the group of ATM cells, such as in the case of AAL5 compliant ATM cells.

Interface 12 is operable to receive data streams that are associated with grouping information and provide them to grouping information extractor 14. Grouping information extractor 14 extracts grouping information from the received data streams, provides the grouping information to queues grouping information database 30, determines the data stream class of service and provides ATM cells to cell distributor 18 which distributes the AT1VI cells among data queues DQ(1,1)-DQ(1,4) according to their class of service.

At this point, queues grouping information database 30 reflects the size and location of each group of ATM cells within queues DQ(1,1)-DQ(1,4), and the queues store ATM cells of up to four class of services.

Downstream receiver 34 is operable to: (i) Receive downstream traffic being transmitted over a passive optical network. The downstream traffic includes downstream broadcast data and grants. (ii) Extract the downstream data and provides it to devices/interfaces (not shown) that are positioned in a downstream path. (iii) Extract data grants. Data grants indicate when (during which at least one consecutive selected timeslot) to transmit upstream data from a queue out of DQ(1, 1)-DQ(1,4). The extracted data grants are provided to upstream assembler and transmitter 28 that in response triggers a provision of a group of ATM cells from a queue to the passive optical network, during the at least one consecutive selected timeslot. (iv) Extract grouping information grants. Grouping information grants indicate when to transmit grouping information and what grouping information to transmit.

It is noted that grouping information grants may further include timing information for determining the timing of upstream transmission (which slot ans within that slot), as a plurality of NUs may transmit their grouping information during a single timeslot. The extracted data grants are provided to upstream assembler and transmitter 28 that in response triggers a provision of a group of ATM cells from a queue to the passive optical network, during the at least one consecutive selected timeslot.

Reference is made to FIG. 1B, which is a schematic illustration of a network unit NU 9, in accordance with an embodiment of the invention.

NU 9 includes a classifier 13 that has a first input 11 for receiving variable size packets such as IP packets, a marking unit 17 and a policing unit 15 located between the classifier 11 and the marking unit 17. Marking unit 17 is coupled to packet distributor 19 for providing IP packets, and is coupled to grouping information database 30 for providing grouping information. Classifier 11 analyzes the incoming IP packets to determine to which class of service they belong. Policing unit 15 is operable to enforce policy rules. For example, the policy rules can include a mechanism for dropping packets, such as but not limited to the WRED or RED mechanisms, in response to various parameters, including network traffic load, and the like. The policy rules may also determine when to change the class of service of incoming packets. Marking unit 17 is operable to add information to the IP packets (to 'mark' them) in response to the classification and policing.

NU 9 further includes a reassembly unit 25 that has a second input 7 for receiving fixed sized cells, such as ATM cells. Reassembly unit 25 is coupled to grouping information extractor 27 for providing reconstructed IP packets. Grouping information extractor 27 is coupled to grouping information database 30 for providing grouping information and is coupled to packet distributor 19 for providing the reconstructed IT packets. Reassembly unit 25 has a plurality of queues (denoted VC/VP Q), each for a single combination of VP/VC fields of incoming ATM cells, such that it is able to reconstruct ATM cells.

Figure 3A:
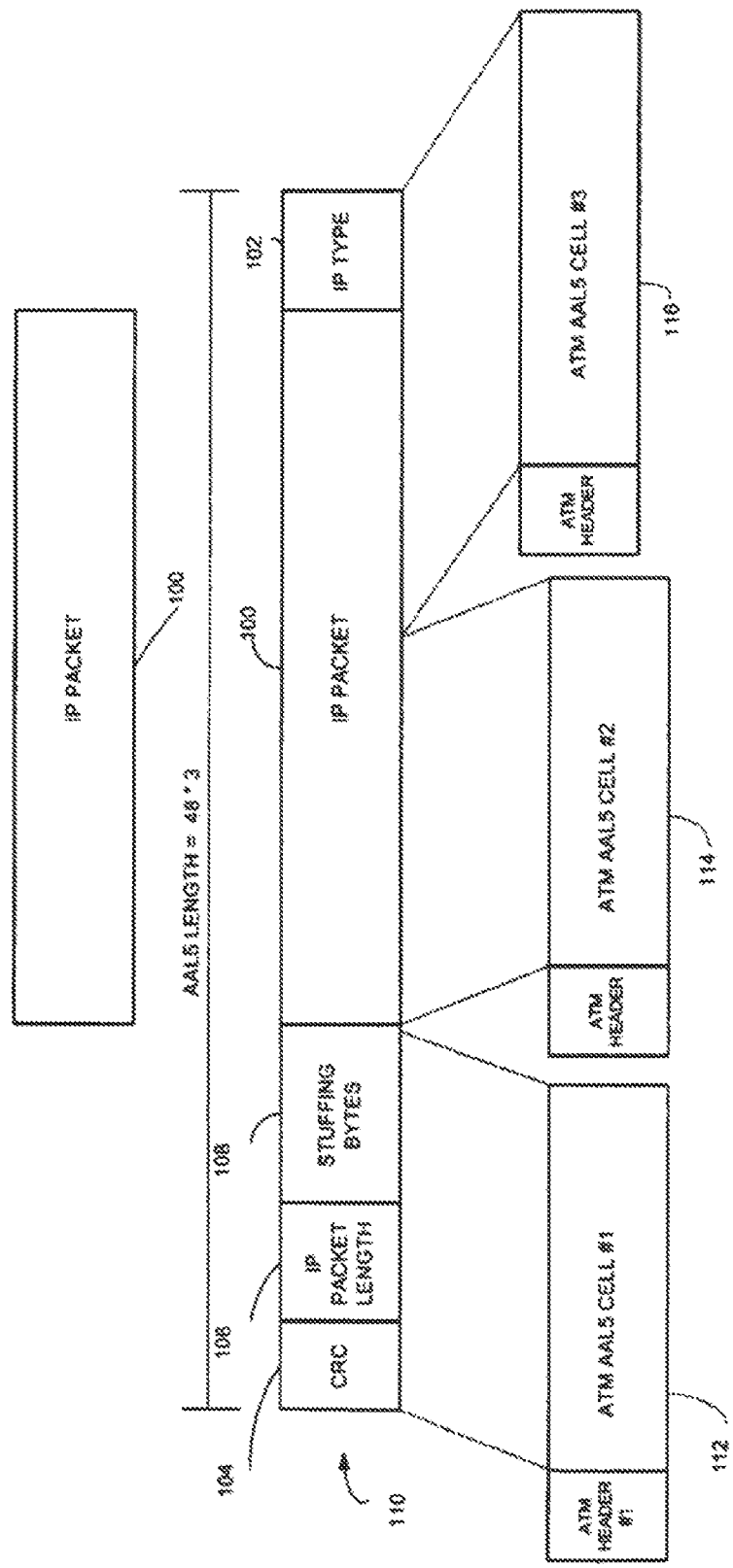
FIG. 3A is a schematic illustration of an IP packet and a group of three AAL5 ATM data cells being generated from the IP packet, in accordance with an embodiment of the invention.

Exemplary segmentation and reassembly operations are illustrated in FIG. 3A. A segmentation process starts by receiving IP packet 100 and ends by the provision of AAL5 compliant ATM cells 112-116. A reassembly process starts by receiving AAL5 compliant ATM cells 112-116 and ends by providing IP packet 100.

An IP packet 100 is converted to an AAL5 compliant packet 110 by adding to the IP packet 100 various fields such as IP type field 102, IP packet length field 106, CRC field 104 and stuffing bytes 108. IP packet length field 106 indicates the length of IP packet 100, and can be used as a grouping information unit. The length of stuffing bytes 108 is designed such that the overall length of AAL5 compliant packet 110 equals N*48 bytes, N being a positive integer. As illustrated by FIG. 3A, the overall length of AAL5 compliant packet 110 is 3*48 bytes. AAL5 compliant packet 110 is converted to three AAL5 ATM cells 112, 114, and 116. These AAL5 ATM cells have the same VP/VC fields within their ATM headers.

Packet distributor 19 is coupled to a plurality of queues, such as PQ(1,1) PQ(1,4) 31-37, and is operable to distribute the IP packets among the queues in response to the class of service of the IP packets.

PQ(1,1)-PQ(1,4) 31-37 are coupled to segmenting and intermediate queue unit 29, that is operable to segment IP packets to ATM cells, such as AAL5 compliant ATM cells, and to provide the ATM cells to upstream assembler and transmitter 28. It is noted that in NU 8 of FIG. 1A IP packets are segmented before being stored in the data queues, while in NU 9 of FIG. 9 the IP packets are segmented only when they are scheduled to be upstream transmitted. It is noted that the order of the storing and segmenting operations is not significant.

Segmenting and intermediate queue unit 29 is operable to segment the IP packets to ATM cells, and to store them in intermediate queues. In cases where not all the ATM cells of an ATM cell group that originated from a single IP packet can be transmitted, the remaining ATM cells, can be provided to upstream assembler and transmitter 28 during another timeslot.

Referring to FIG. 2, illustrating headend, such as OLT 38, in accordance with an embodiment of the invention.

OLT 38 includes (i) downstream data interface 40, (ii) grant controller 48, (iii) downstream transmitter 46, (iv) grant allocator 49, (v) upstream receiver 54, and (vi) grant queues GQ1-GQ4 40-46.

Downstream data interface 40 and grant allocator 49 are coupled to downstream transmitter 48. Grant controller 48 is coupled to upstream receiver 54 and to grant queues GQ1-GQ4 40-46. Grant queues GQ1-GQ4 40-46 are coupled to grant allocator 49.

Downstream data interface is operable to receive data to be downstream transmitted to NUs over a passive optical network and to provide said data to downstream transmitter 46. Downstream transmitter 46 is operable to further receive data grants and grouping information request grants from grant allocator 48 and to generate downstream frames.

Upstream receiver 54 receives upstream transmitted frames and is operable to extract grouping information out of the upstream transmitted frames, to provide the grouping information to grant allocator 48 and to provide the upstream data along an upstream path from OLT 38 to other headends, networks or other network units.

Grant controller 48 is operable to receive grouping information and to issue data grants in response to the grouping information. The allocated data grants are stored in grant queues GQ I-GQ4 40-46, according to their class of service.

Grant queues GQ1-GQ4 40-46 are coupled to grant allocator 49 which selectively fetches issued data grants according to a predefined order, and sends a sequence of data grants to downstream transmitted 46, where the data grants are assembled in to a downstream frame. For example, the selection may start by selecting a issued data grants of the highest class of service, and continue to the lower priority class of service grant queues, as long as additional timslots may be allocated. It is noted that when implementing a fixed timeslot allocation, such as in the case of type 1 T-CONTs, an additional unit (not shown) may be operable to generate data grants to allows a fixed timeslot allocation.

Figure 4:
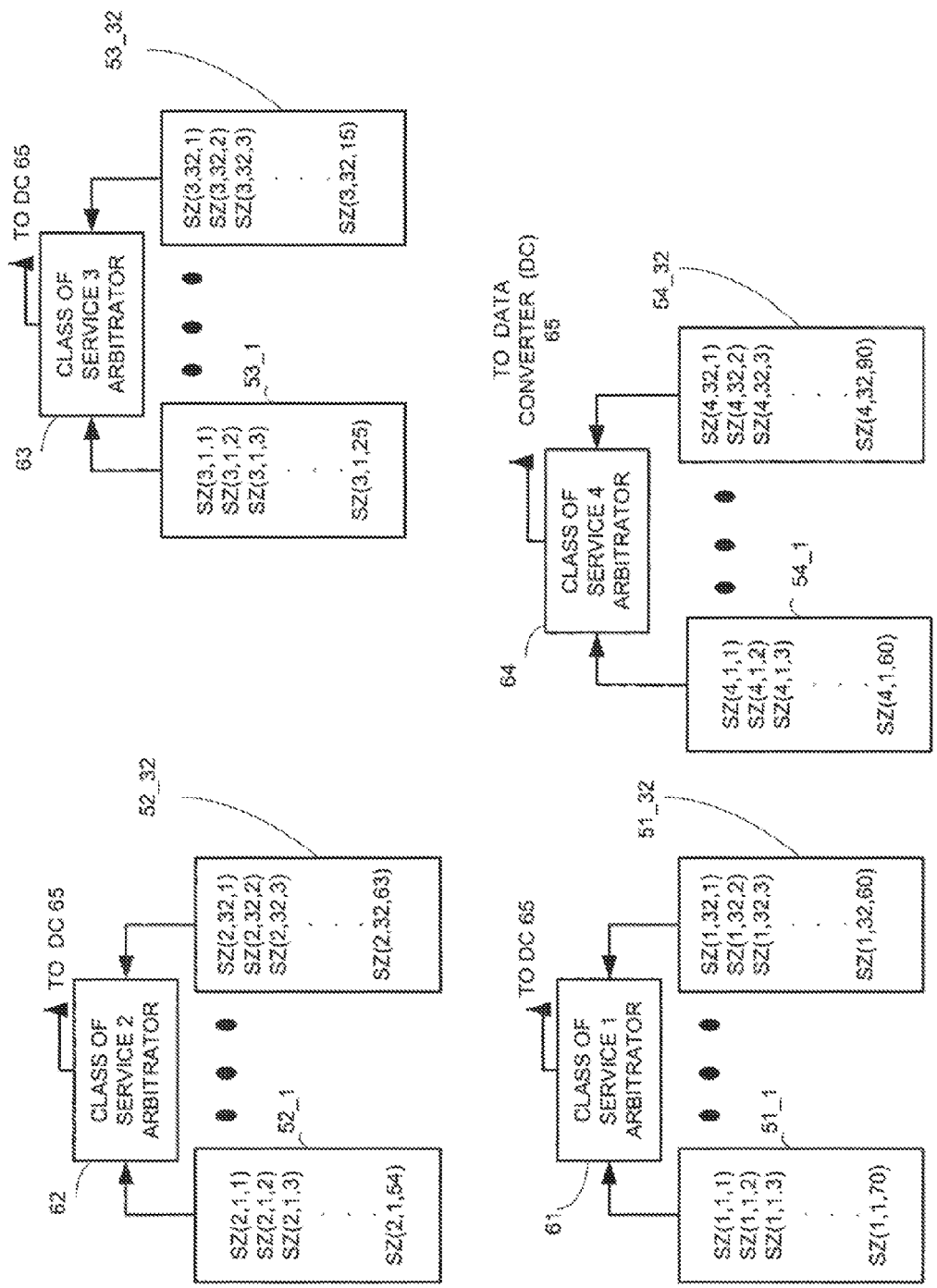
FIG. 4 is a schematic illustration of a portion of a queues database, in accordance with an embodiment of the invention.

Reference is now made to FIG. 4 which illustrates an exemplary portion of grant controller 48. Grant controller 48 includes grouping information database 50, a plurality of arbitration units such as arbitrators 61-64, and data converter 65.

Portion 51_1 of grouping information database 50 stores the grouping information of DQ(1,1)—a list of "net" sizes/length of relevant payload of seventy consecutive ATM cell groups that are stored at DQ(1,1): SZ(1,1,1)-SZ(1,1,70). SZ(1,1,1) being the size of the group of ATM cells that is located at the head of DQ(1,1). Portion 51_32 of grouping information database 50 stores the grouping information of DQ(32,1)—a list of "net" sizes of sixty consecutive ATM cell groups that are stored at DQ(32,1): SZ(32,1,1)-SZ(32,1,60). Portions 51_1-51_32 of queues database 50 that are associated with a first class of service are accessible to a first arbitrator 61 that determines which first class of service ATM cell group to transmit.

Portion 52_1 of grouping information database 50 stores the grouping information of DQ(1,2)—a list of "net" sizes of fifty four consecutive ATM cell groups that are stored at DQ(1,2): SZ(1,2,1)-SZ(1,2,54). SZ(1,2,1) being the size of the group of ATM cells that is located at the head of DQ(1,2). Portion 52_32 stores the grouping information of DQ(32, 2)—a list of "net" sizes of sixty three consecutive ATM cell groups that are stored at DQ(32,2): SZ(32,2,1)-SZ(32,2,63). Portions 52_1-52_32 of queues database 50 are associated with a second class of service are accessible to a second arbitrator 62 that determines which second class of service ATM cell group to transmit.

Portion 53_1 of grouping information database 50 stores the grouping information of DQ(1,3)—a list of "net" sizes of twenty five consecutive ATM cell groups that are stored at DQ(1,3): SZ(1,3,1)-SZ(1,3,25). SZ(1,3,1) being the size of the group of ATM cells that is located at the head of DQ(1,3). Portion 53_32 stores the grouping information of DQ(32, 3)—a list of "net" sizes of fifteen consecutive ATM cell groups that are stored at DQ(32,3): SZ(32,3,1)-SZ(32,3,15). Portions 52_1-52_32 of queues database 50 are associated with a third class of service are accessible to a third arbitrator 63 that determines which third class of service ATM cell group to transmit.

Portion 54_1 of grouping information database 50 stores the grouping information of DQ(1,4)—a list of "net" sizes of sixty consecutive ATM cell groups that are stored at DQ(1,4): SZ(1,4,1)-SZ(1,4,60). SZ(1,4,1) being the size of the group of ATM cells that is located at the head of DQ(1,4). Portion 54_32 stores the grouping information of DQ(32,4)—a list of "net" sizes of ninety consecutive ATM cell groups that are stored at DQ(32,4): SZ(32,4,1)-SZ(32,4,90). Portions 54_1-54_32 of queues database 50 are associated with a fourth class of service are accessible to a fourth arbitrator 64 that determines which fourth class of service ATM cell group to transmit.

The results of the arbitration cycles are fed to data converter 65 and then to grant queues GQ1-GQ4 40-46. Data converter 65 is operable to convert a result of an arbitration, that usually reflects the "net' size of ATM payload to transmit, to an amount of timeslot to allocate to the transmission. Accordingly, GQ1-GQ4 40-46 store the amount of consecutive timeslots to allocate for an upstream transmission from a certain NU queue. These amounts are also referred to as issued data grants.

According to an aspect of the invention, OLT 38 determines the amount of grouping information to receive from each NU. This determination allows for reducing the amount of upstream bandwidth assigned to the transmission of grouping information.

It is noted that during a MAC cycle a maximal predefined amount of data may be upstream transmitted from each queue. The maximal amount is limited by upstream transmission rates and by the rate in which the upstream data is provided to the queue. The maximal amount can be predefined or can be dynamically changed to reflect various changes in the network.

At each MAC cycle OLT 38 determines the grouping information to be upstream transmitted by the NUs. The amount of grouping information is responsive to the grouping information that has already been received by OLT 38, the maximal predetermined amount and an estimation of the ATM cell groups that are stored at the queues of which their grouping information was not yet transmitted to OLT 38.

An estimation of ATM cell groups size that are supposed to be stored in a data queue can be based upon statistical analysis of ATM cell groups received from (i) that data queue, (ii) queues that belong to the same T-CONT, (iii) queues that belong to the same ONU, (iv) queues that service the same class of service, from ATM cell groups received from a certain application, from ATM cell groups that originated from packets of a certain networking protocol, from ATM groups originating from the same source and/or destined to the same destination, and the like.

For example, and referring to FIG. 4, it is assumed that (a) the grouping information is the length (in bytes) of IP packets from which ATM cells were generated (b) the received data streams are Ethernet compliant and the minimal size of an Ethernet packet is 64 bytes, (c) the maximal amount of bytes that can be transmitted from data queue DQ(32,4) during a single MAC cycle is 5000, (d) portion 54_32 stores SZ(32,4, 1)-SZ(32,4,90), (e) the aggregate size of SZ(32,4)-SZ(32,4, 90) is 4540. Then OLT 38 will request ONIJ to report the sizes of the next ten ATM cell groups within DQ(32,4): (5000-4540)164=10.

Referring to FIG. 3A illustrating downstream frames 120-140, in accordance to embodiments of the invention.

The upper part of FIG. 3A illustrates three downstream frames, such as T-frames, that are transmitted during a single MAC cycle. Each T-frame out of T-frames 120, 130 and 140 includes fifty-three slots.

T-frame 120 includes fifty-one ATM cell slots and two framing slots, also referred to as PLOAM slots. A first PLOAM slot 121 is followed by twenty seven ATM slots 122_2-122_28, second PLOAM slot 123 and twenty four ATM slots 122_30-122_53.

T-frame 120 is followed by T-frame 130 that includes fifty-one ATM cell slots and two framing slots, also referred to as PLOAM slots. A first PLOAM slot 131 is followed by twenty seven ATM slots 132_2-132_28, second PLOAM slot 133 and twenty four ATM slots 132 30-132_53.

T-frame 130 is followed by T-frame 140 that includes forty-three ATM cell slots, two framing (PLOAM) slots and eight GI slots. A first PLOAM slot 141 is followed by twenty seven ATM slots 142_2-142_28, second PLOAM slot 143, sixteen ATM slots 142_30-142_45, and eight GI slots 144_1-144_8 in which a grouping information request vector 146 is transmitted.

The mentioned above format is suited to an optical passive network in which the downstream data rate equals the data upstream rate. Accordingly, each pair of PLOAM slots (121, 123), (131, 133) and (141,143) determines which upstream data to transmit during an upstream frame of fifty three slots.

Eight GI slots 144_1-144_8 are allocated for transmitting grouping information requests that determine which grouping information to transmit upstream during a MAC cycle of three T-frames.

Figure 3B:
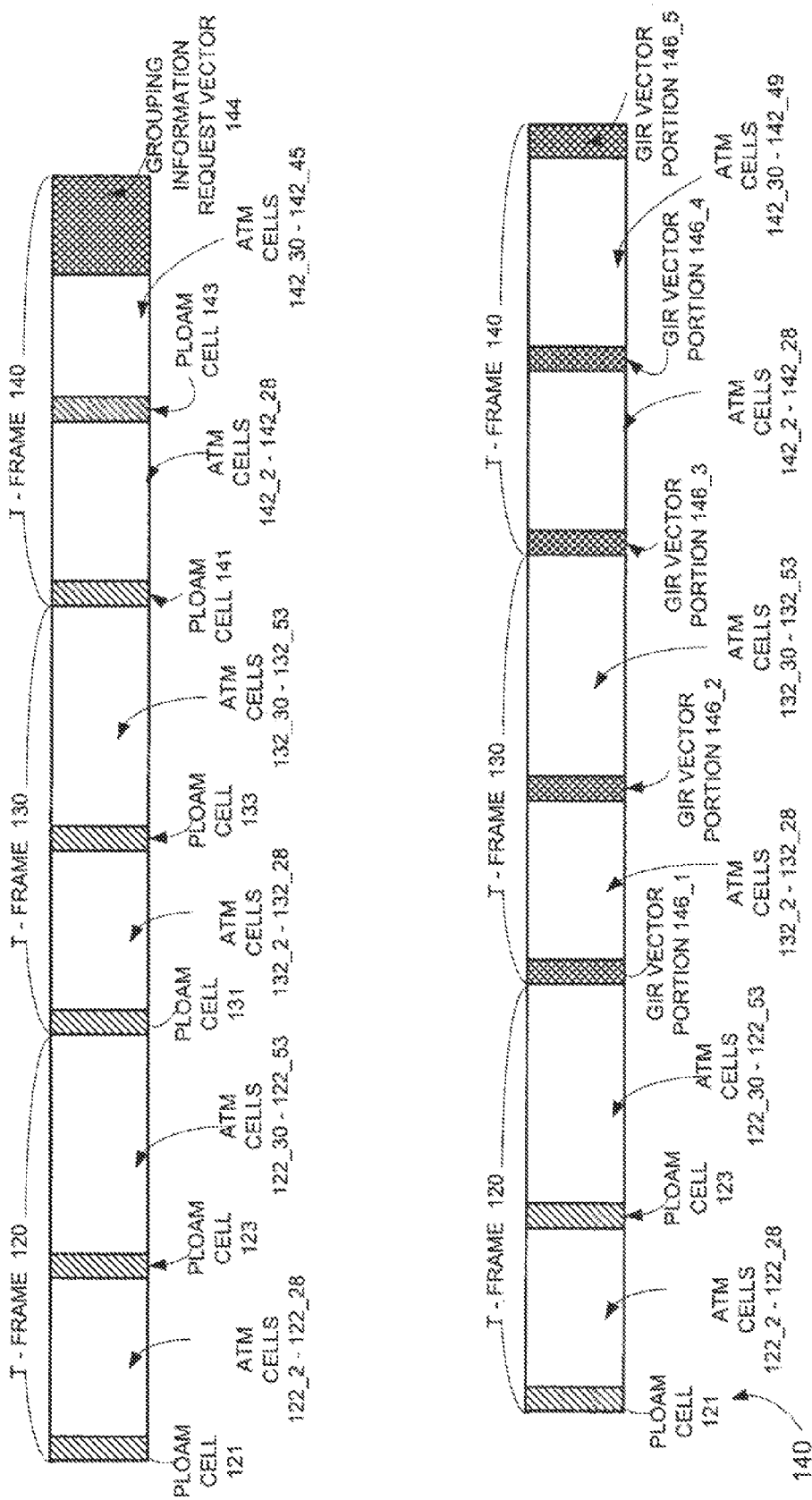
FIG. 3B is a schematic illustration of downstream data frames, in accordance with an embodiment of the invention.

The lower part of FIG. 3B illustrates a MAC cycle the includes three T-frames, that is suited to an optical passive network in which the downstream data rate is three times faster than the upstream data rate. In such a case portions 146_1, 146_2, 146_3 and 146_4 of grouping information request vector 146 are transmitted during slots 131, 133, 141 and 143 accordingly. It is noted that the third T-frame (140) can be utilized to convey more upstream ATM cells or can include more grouping information request slots.

Figure 5A:
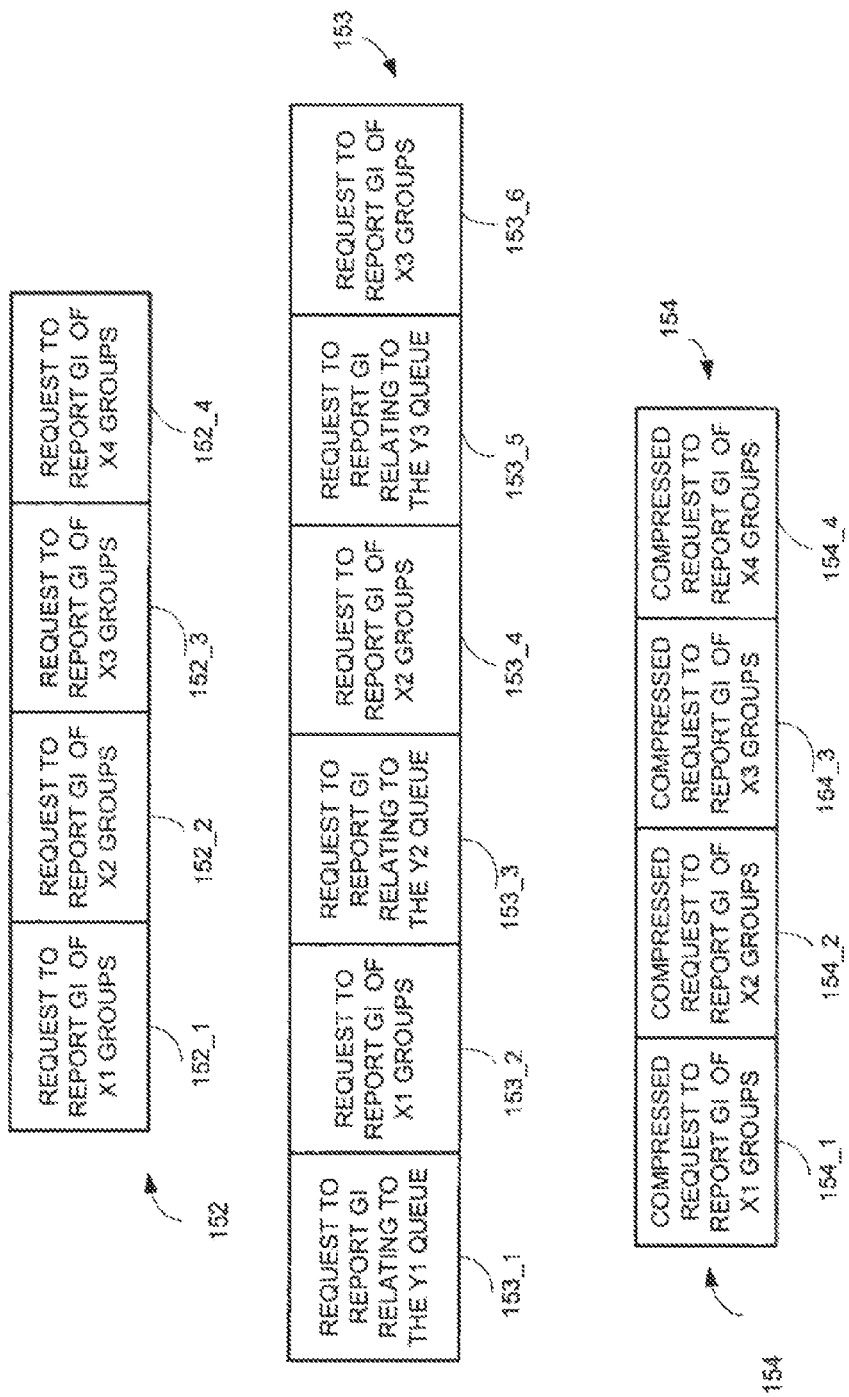
FIGS. 5A-5B are schematic illustrations of grouping information request vectors, in accordance with embodiments of the invention.

Referring to FIG. 5A illustrating grouping information request vectors 152, 153 and 154 in accordance to embodiments of the invention.

Grouping information request vector 153 includes two types of fields—a first type field that indicates an identity of a queue and a second type indicating the amount of grouping information, relating to that queue, to be transmit. For example, field 153_1 "REQUEST TO REPORT GI RELATING TO THE Y1 QUEUE" is followed by field 153_2 "REQUEST TO REPORT GI OF X1 GROUPS". These two fields are interpreted as a request to upstream transmit grouping information relating to X1 consecutive ATM cell groups that are stored at the Y1'th queue, starting from the first ATM cell group which its grouping information was not reported yet. Each NU monitors the grouping information of each of the NU queues and tracks the previously upstream transmitted grouping information. Accordingly, each NU is able to determine which grouping information to prepare for upstream transmission.

Grouping information request vector 152 includes only the second type of fields and may be transmitted when the order of the relevant queues is predefined.

Grouping information request vector 154 is compressed according to a predefined compression scheme. It includes compressed fields of the second type only, although this is not necessarily so. For example, a compressed grouping information request vector may also include the two types of fields.

Grouping information request vector 153 includes a request to transmit grouping information relating to X1 ATM cell groups from queue Y1 (fields 153_1 and 153_2), a request to transmit grouping information relating to X2 ATM cell groups from queue Y2 (fields 153_3 and 153_4), and a request to transmit grouping information relating to X3 ATM cell groups from queue Y3 (fields 153_5 and 153_6).

Grouping information request vector 152 includes a request to transmit grouping information relating to X1 ATM cell groups from queue Y1 (field 152_1, the identity of the queue is predefined), a request to transmit grouping information relating to X2 ATM cell groups from queue Y2 (field 152_2, the identity of the queue is predefined), a request to transmit gyouping information relating to X3 ATM cell groups from queue Y3 (fields 152_3, the identity of the queue is predefined) and a request to transmit grouping information relating to X4 ATM cell groups from queue Y4 (fields 152_4, the identity of the queue is predefined).

Grouping information request vector 154 includes the same requests as grouping information request vector 152, but in a compressed from.

Figure 5B:
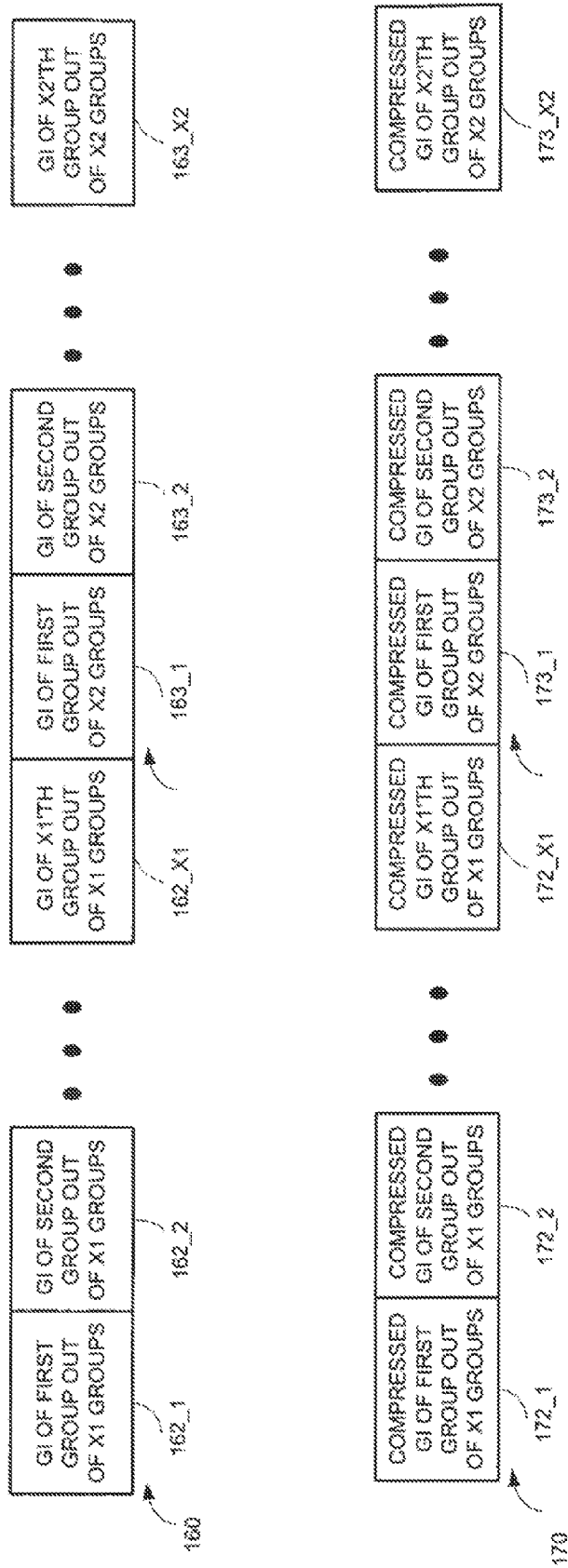

Reference is now made to FIG. 5B, illustrating grouping information vectors 160 and 170 in accordance to embodiments of the invention.

Grouping information vector 170 is a compressed version of grouping information vector 160.

The timing of the upstream transmission of each portion of grouping information vectors is determined by OLT 38 and may either be predefined to included within grouping information request vectors. It is noted the methods for timing the upstream transmission may implemented in a maimer that resembles the timing of ITU-T Recommendation G.983.4 compliant mini-slots.

Grouping information vectors 160 and 170 are transmitted in response to (i) a reception of fields 152_1 and 152_2 of grouping information request vector 152, or (ii) a reception of fields 154_1 and 154_2 of grouping information request vector 154, or (iii) a reception of fields 153_1, 153_2, 153_3 and 153_4 of grouping information request vector 153. Accordingly, the grouping information vector 160 starts by X1 fields 162_1-162_X1 that embeds the grouping information relating to X1 ATM cell gyoups being stored within queue Y1. These fields are followed by X2 fields 163_1-163_X2 that embed the grouping information relating to X2 ATM cell groups being stored within queue Y2.

Grouping information vector 170 includes X1 fields 172_1-172_X1 that embed compressed grouping information relating to X1 ATM cell groups being stored within queue Y1. These fields are followed by X2 fields 173_1-173_X2 that embed compressed grouping information relating to X2 ATM cell groups being stored within queue Y2.

It is noted that the timing of the upstream transmission may be predetermined, negotiated between the OLT 38 and NUs or be included within the grouping information request vector.

Figure 5C:
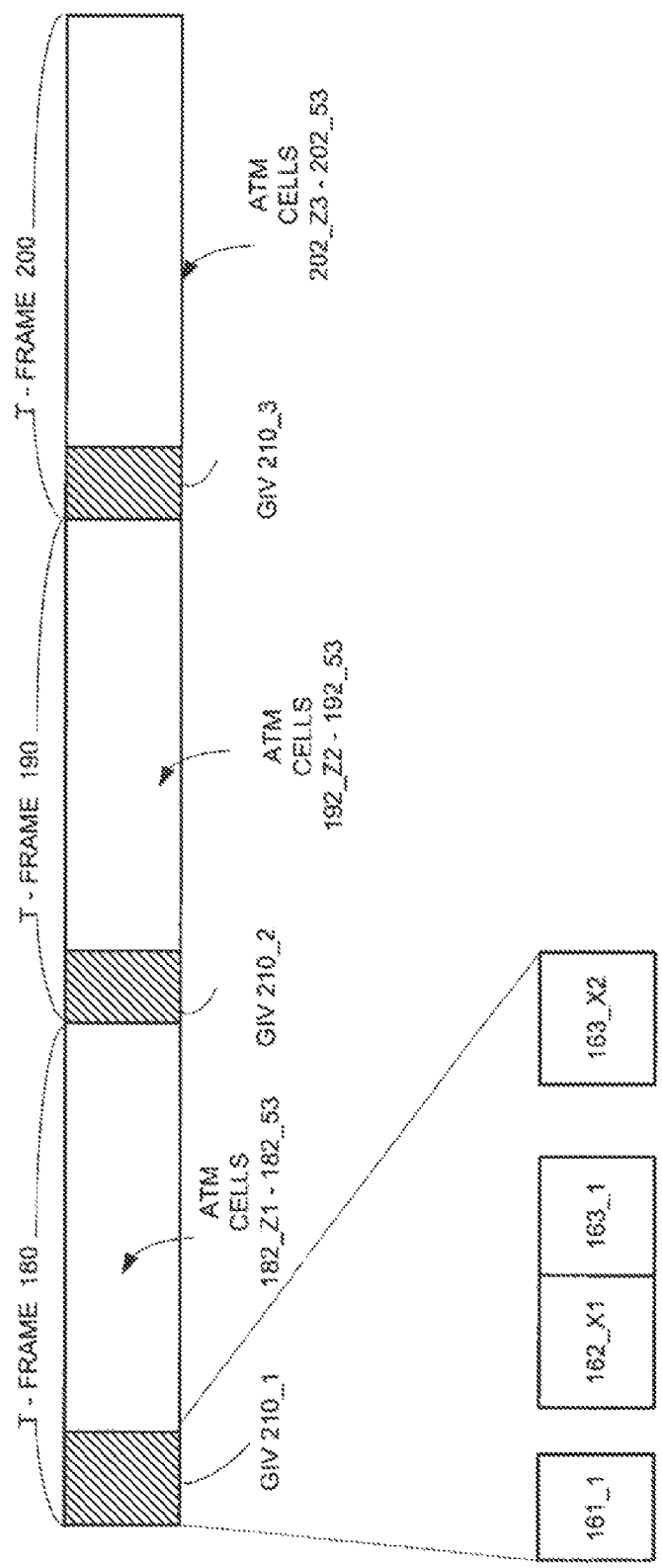
FIG. 5C is a schematic illustration of an upstream frame, in accordance with an embodiment of the invention.

FIG. 5C illustrates an upstream frame, in accordance with an embodiment of the invention.

The upstream frame includes three upstream, such as T-frames 180, 190 and 200. Each T-frame includes 53 slots.

Portions of grouping information vectors (also referred to as GIV), are transmitting in predefined slots, such as GIVs 210_1, 210_2 and 210_3 OLT 38 determines the position (timing) of each of these sots and also determines which grouping information to send during each slot. Each T-frame out of T-frames 180, 190 and 200 starts by a GI vector slot, but this is not necessarily so. The inclusion of a GI vector slot within each T-frame allows to update the GI of queues several times during a MAC cycle, thus allowing relatively frequent update of the timing information, and especially allows for upstream transmitting grouping information of high priority (high class of service), thus allowing to issue upstream transmit the high priority information before the current MAC cycle ends.

The length of each GIV slot may be predefined but it also me be configured to match the length of grouping information vectors from a certain set of queues. For example, the length (in ATM cells) of 210_1, 210_2 and 210_3 are (Z1-1), (Z2-1) and (Z3-1) accordingly.

Figure 6A:
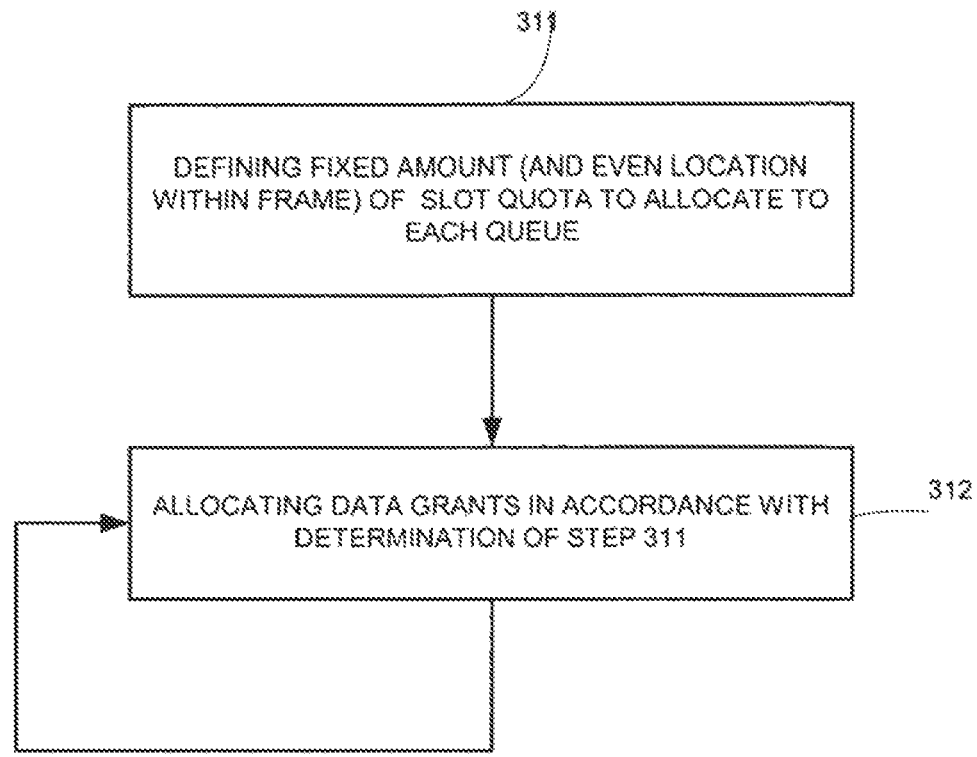
FIGS. 6A-6C are flow charts illustrating various arbitration mechanisms, in accordance with embodiments of the invention.
Figure 6B:
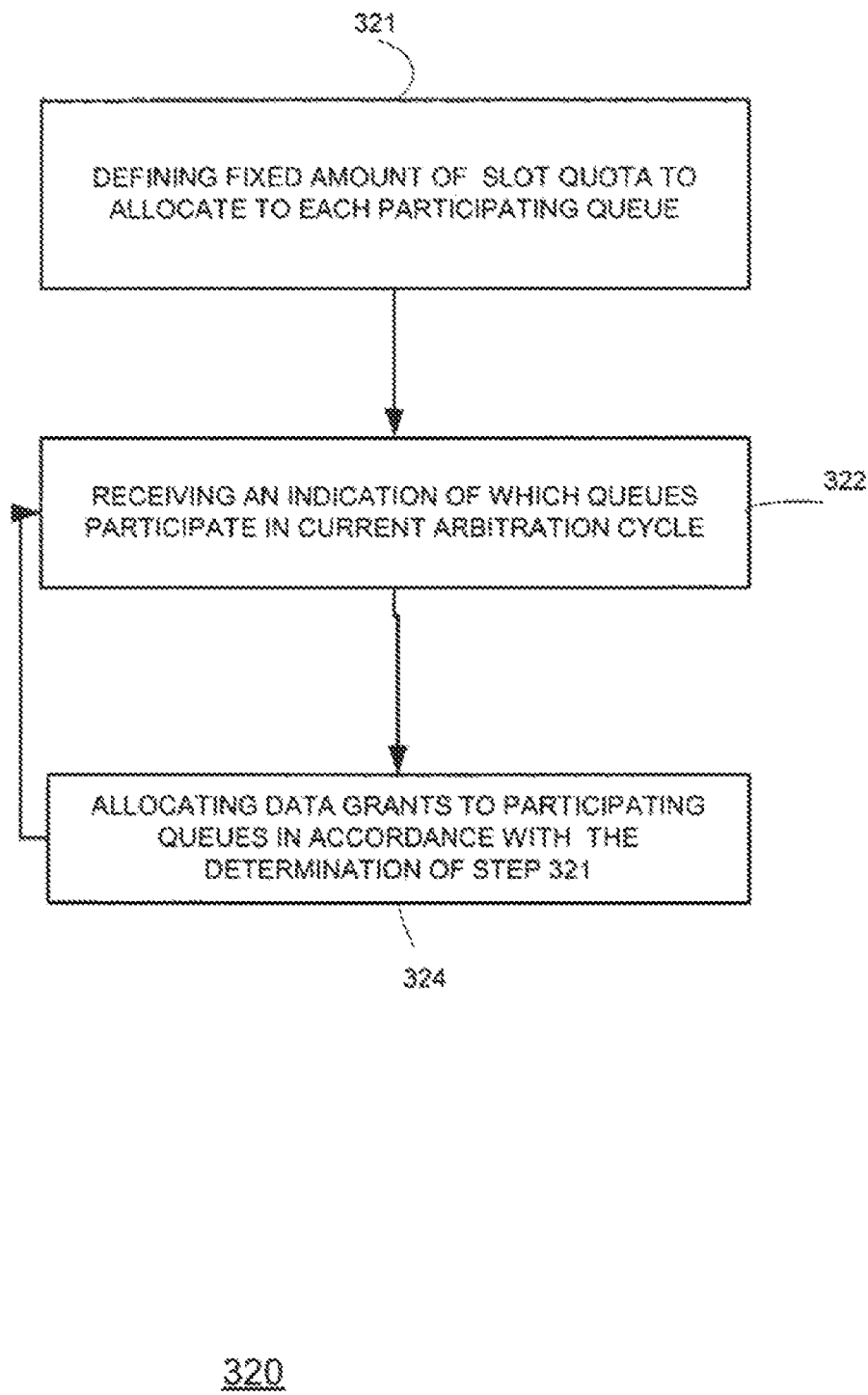
Figure 6C:
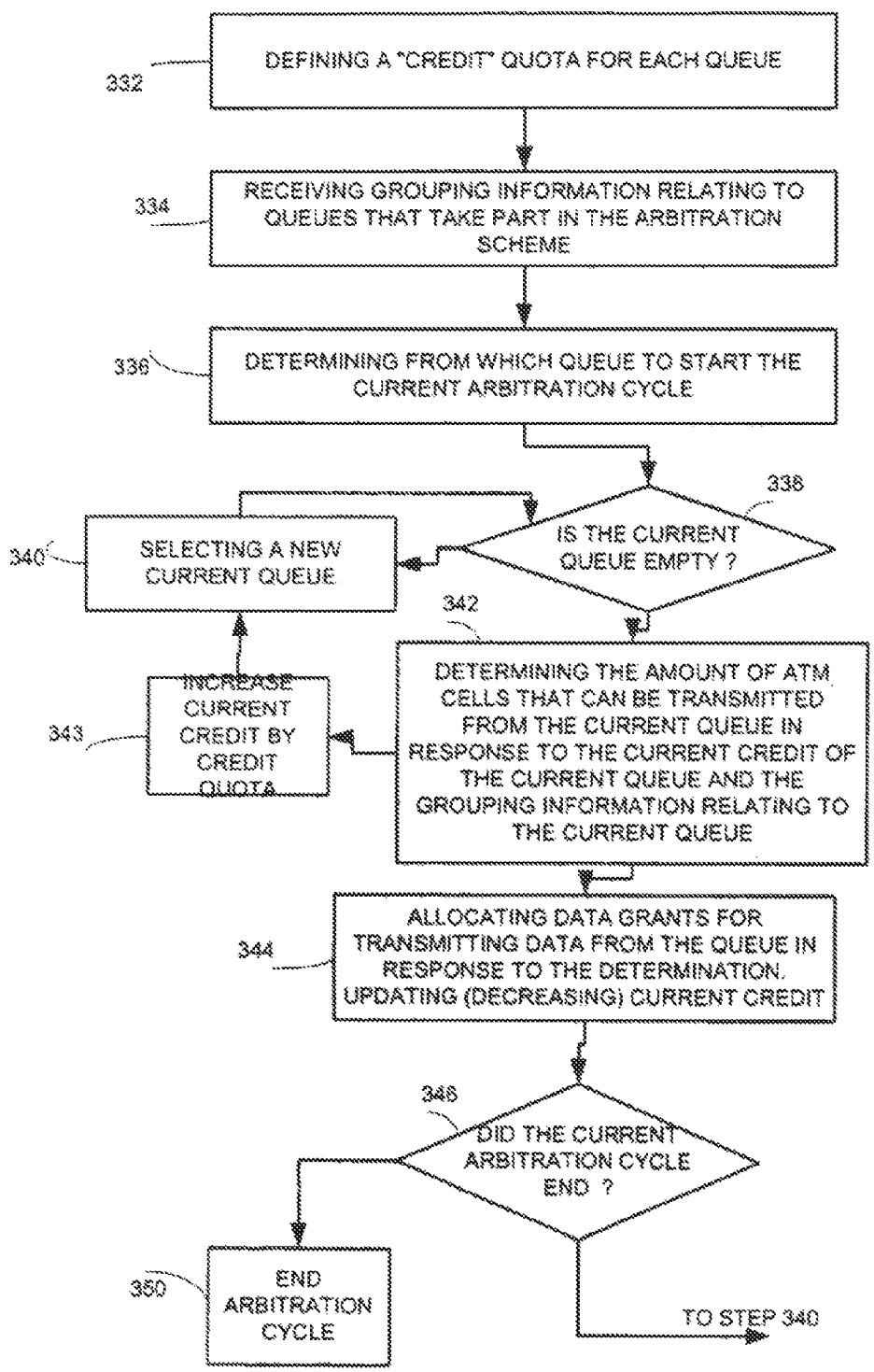

Reference is now made to FIGS. 6A-6C, illustrating various arbitration mechanisms, in accordance with preferred embodiments of the invention. These arbitration schemes may be implemented by at least one of arbitrator out of arbitrators 61-64.

Conveniently, each arbitrator is operable to allocate resources/grant upstream data transmission of data of a certain service of class. Arbitrator 61 is operable to grant upstream data transmissions of the first class of service, arbitrator 62 is operable to grant upstream data transmissions of the second class of service, arbitrator 63 is operable to grant upstream data transmissions of the third class of service, arbitrator 64 is operable to grant upstream data transmissions of the fourth class of service.

It is noted that the result of an arbitration process, such as an arbitration process implemented by arbitrators 61-64, is a data grant. The data grants are further selectively fetched by grant allocator 49, that actually allocates upstream timeslots.

FIG. 6A is a flow chart illustrating a first arbitration mechanism 310. First arbitration mechanism 310 is operable to allocate "fixed" data grants—data grants for transmitting a fixed amount of data. First arbitration mechanism 310 starts by a step 311 of defining an the fixed amount of slot quota to allocate to each queue out of a set of queues that are arbitrated by first arbitration process 310. Usually, the set include queues of the same class of service. It is noted that queues that are associated to the same class of service may be arbitrated by a single arbitration process, but this is not necessarily so and they may be partitioned to a plurality of sets, each set of a predefined priority. It is further noted that each queue may be assigned a different fixed amount of slot quota.

Step 311 is followed by step 312 of allocating data grants in accordance with definitions of step 311. The data grant allocation is usually done regardless the emptiness of the queues. Step 312 may be executed each MAC cycle.

FIG. 6B is a flow chart illustrating a second arbitration mechanism 320. Second arbitration mechanism 320 is operable to allocate a predefined amount of data grants in response to an indication that a queue that takes part in the arbitration cycle is not empty. Such a queue is referred to as a participating queue. Second arbitration mechanism 320 starts by a step 321 of defining an amount of slot quota to allocate to each participating queue during an arbitration cycle. Step 321 is followed by step 322 of receiving an indication of the participating queues (which queues out of possible participating queues are not empty). This indication may be derived from previously received grouping information. Step 322 is followed by a step 324 of allocating data grants to participating queues.

FIG. 6C is a flow chart illustrating a third arbitration mechanism 330. Third arbitration mechanism 330 is operable to allocate data grants in response to a predefined credit assigned to each queue and to the grouping information.

Third arbitration mechanism 330 starts by a step 332 of defining a "credit" quote for each queue that is arbitrated by third arbitration mechanism 330. The "credit" quote is an amount of timeslots/data grants that can be allocated to upstream data transmission from the queue. The credit quote assigned to each queue reflects the queue priority/relative allocation of data grants. According to an aspect of the invention that the credit quota and/or can be dynamically changed. Step 332 is followed by step 334 of receiving grouping information relating to queues that are arbitrated by third arbitration mechanism 330.

Step 334 is followed by step 336 of determining from which queue to start the current arbitration cycle. Conveniently, the queues are arranged in a cyclical manner and an arbitration cycle starts from a queue that follows the last queue that was processed during a previous arbitration cycle.

Step 336 is followed by step 338 of determining whether the current queue is empty. If the answer is "yes" step 338 is followed by step 340 of selecting a new current queue. If the queues are arranged in a round robin formation, the next current queue is an adjacent queue of the round robin formation. If the queue is not empty, step 338 is followed by step 342.

Step 342 includes determining the amount of ATM cell groups that can be transmitted given the current credit of the current queue. It is noted that during a first iteration of the arbitration mechanism the current credit may equal the credit quote, but as further illustrated, the current quote is updated during the arbitration process. The ATM cell group may include consecutive ATM cell groups, starting with the first ATM cell group—the ATM cell group that is stored at the head of the current queue. According to an aspect of the invention step 342 includes determining a "net" amount of data that may be transmitted, whereas the "net" amount is further converted to an amount of data cells.

If the current credit does not allow for transmitting at least the first ATM cell group then step 342 is followed by step 341 of increasing the current credit by the credit quota. Step 341 is followed by step 340.

If the current credit does allow for transmitting a set of consecutive ATM groups, step 342 is followed by step 344 of allocating data grants for the transmission of the set and updating the current credit by adding a credit quota and decreasing the aggregate size of the ATM cell groups that form the set.

Step 344 is followed by step 346 of determining when the arbitration cycle ends. The determination can be responsive to the amount of data grants that was allocated or to the amount of iterations of steps 338-342. The overall amount of allowed data grants can be dynamically changed.

If the arbitration cycle ended, step 346 is followed by step 350 ending the arbitration cycle. Else, step 346 is followed by step 340 of selecting a new current queue.

Distinct arbitration schemes, such as but not limited to arbitration schemes 310-330, may be implemented by various arbitrators, thus allowing for tailoring arbitration schemes to the characteristics of each class of service. These characteristics may include, bursty behavior patterns, delay sensitivity and the like.

Systems and methods that are adapted to handle various class of services include dependent arbitrators and independent arbitrators. Independent arbitrators allocate data grants regardless the allocation of data grants by other arbitrators. Dependent arbitrators allocate data grants in response to data igant allocated by other arbitrators. Independent arbitrators are usually utilized for the highest (most important) class of services and to fixed arbitration schemes. Dependent arbitrators are usually utilized for lower class of services. Dependent arbitrators may receive various input from other arbitrators, such as a residual overall data grant amount to be allocated during an arbitration cycle, or a relationship between allocated data grants to queues. In dependent arbitrators that implement the third arbitration mechanism 330 the credit quota, the current credit and the total amount of data grant location per arbitration cycle can be dynamically changed in response to the receive input from other arbitrators.

For example, systems and methods that are operable to handle the following class of services (provisioned bandwidth, guaranteed bandwidth, assured bandwidth and non-assured bandwidth) may (i) utilize an independent arbitrator that implements a first arbitration mechanism 310 for handling provisioned bandwidth, (ii) utilize a dependent arbitrator that depends upon the implements a second arbitration mechanism 320 for handling allocated bandwidth, the dependent arbitrators receives the amount of overall allowed data grants, given the results of the independent arbitrator, (iii) utilize a dependent arbitrator that implements a third arbitration mechanism 330 for handling provisioned bandwidth, the dependent arbitrators receives the amount of overall allowed data grants, given the results of the independent arbitrator and the mentioned above dependent arbitrator. The dependent arbitrator can also receive a relationship between data grant allocations of distinct queues in response to the allocation of the previous arbitrator, and (iv) utilize a dependent arbitrator that implements a third arbitration mechanism 330 for handling nonassured bandwidth.

It is noted that other combinations of arbitration schemes may be implemented to fit various class of services, such as but not limited to provisioned bandwidth, minimum latency, assured bandwidth, non-assured bandwidth, minimum drop, minimum jitter and a combination of the mentioned above class of services.

An example of the amount of grouping information slots and other system parameters, is illustrated below.

It is assumed that: (i) a MAC cycle includes three T-frame, (ii) downstream data rate of 622 Mbytes/sec, (iii) upstream data rate of 155 Mbytes/sec, (iv) an IP packet is represented by two to five ATM cells; (v) a network unit that is connected to 100baseT communication lines receives a maximal amount of thirty IP packets, each being 64 byte long, per MAC cycle, it typically receives ten IP packets, each being 200 byte long, (vi) a network unit that is connected to 10baseT communication lines receives a maximal amount of three IP packets, each being 64 byte long, per MAC cycle, it typically receives a single 200 bytes long IP packet, (vii) a plurality of network units share the same upstream channel, about four to eight of them are connected to 100baseT communication lines, the other network units are connected to 10baseT communication lines.

Accordingly, during a single MAC cycle a maximal amount of 318 IP packets are received, typically only 129 IP packets are received. A grouping information unit is a byte long, but may also be two bytes long. Assuming that the transmission of grouping information requires additional bytes, for example, for re-transmitting grouping information, for transmitting CRC bits and the like, then each MAC cycle an amount of 3*318*1 bytes, that can be encapsulated within 20 ATM cells, are required.

It is noted that the method and apparatus according to the present invention can be implemented either in hardware, in software or in a combination thereof.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

The invention claimed is:

1. A network unit in a passive point to multipoint optical network, comprising:
    a receiver configured to receive data grants from a media access controller associated with the passive point to multipoint optical network;
    a group information generator unit configured to generate grouping information, indicating at least a length of a variable length data packet to be transmitted in an upstream transmission on the passive point to multipoint optical network; and
    a transmitter configured to transmit a segmented group of fixed sized data units, corresponding to the variable length data packet, to a headend unit in the passive point to multipoint optical network in response to data grants issued by the media access controller based on the grouping information.

2. The network unit of claim 1, further comprising:
    a first input port configured to receive the variable length data packet; and
    a segmenting unit configured to segment the variable length data packet to provide the segmented group of fixed sized data units.

3. The network unit of claim 2, further comprising:
    a second input port configured to receive a plurality of fixed length data packets; and
    an assembly unit configured to group the plurality of fixed length data packets into one or more groups of fixed length data packets.

4. The network unit in of claim 3, wherein the group information generator unit is configured to generate grouping information indicating one or more parameters of the one or more groups of fixed length data packets.

5. The network unit of claim 3, further comprising:
    a group information extractor unit configured to extract grouping information embedded within the one or more groups of fixed length data packets.

6. The network unit in of claim 3, wherein the fixed length data packets are Asynchronous Transfer Mode data packets.

7. The network unit of claim 1, wherein the data grants are operative to authorize the network unit to consecutively transmit the segmented group of fixed sized data units during consecutive timeslots.

8. The network unit of claim 1, wherein the grouping information indicates a group of variable length data packets that are stored in a queue within the network unit.

9. The network unit of claim 1, further comprising:
    a classification unit configured to classify the variable length data packet based at least in part on a class of service of the variable length data packet.

10. The network unit of claim 1, wherein the variable length data packet is an Internet Protocol data packet.

11. The network unit of claim 1, wherein the receiver is further configured to receive the data grants from the media access controller in response to the media access controller issuing the data grants based on an arbitration scheme.

12. A method for operating a network unit in a passive point to multipoint optical network, the method comprising:
    receiving data grants from a media access controller associated with the passive point to multipoint optical network;
    generating grouping information that indicates at least a length of a variable length data packet to be transmitted in an upstream transmission on the passive point to multipoint optical network; and
    transmitting a segmented group of fixed sized data units, corresponding to the variable length data packet, to a headend unit in the passive point to multipoint optical network in response to data grants issued by the media access controller based on the grouping information.

13. The method of claim 12, further comprising:
    receiving the variable length data packet; and
    segmenting the variable length data packet to provide the segmented group of fixed sized data units, to facilitate transmission of the segmented group of fixed sized data units by the transmitter to the headend unit.

14. The method of claim 12, further comprising:
    receiving a plurality of fixed length data packets; and
    grouping the plurality of fixed length data packets into one or more groups of fixed length data packets.

15. The method of claim 14, further comprising:
    generating grouping information indicating one or more parameters of the one or more groups of fixed length data packets.

16. The method of claim 14, further comprising:
    extracting grouping information embedded within the one or more groups of fixed length data packets.

17. The method of claim 14, wherein the receiving the data grants further comprises:
    receiving data grants such that the data grants are operative to authorize the network unit to consecutively transmit the segmented group of fixed sized data units during consecutive timeslots.

18. The method of claim 14, further comprising:
    classifying the variable length data packet based at least in part on a class of service of the variable length data packet.

19. An apparatus for use in a network unit in a passive point to multipoint optical network, the apparatus comprising:
    a receive block configured to receive data grants from a media access controller associated with the passive point to multipoint optical network;
    a group information generator block configured to generate grouping information, indicating at least a length of a variable length data packet to be transmitted in an upstream transmission on the passive point to multipoint optical network; and
    a transmit block configured to transmit a segmented group of fixed sized data units, corresponding to the variable length data packet, to a headend unit in the passive point to multipoint optical network in response to data grants issued by the media access controller based on the grouping information.

20. The apparatus of claim 19, further comprising:
    a classification block configured to classify the variable length data packet based at least in part on a class of service of the variable length data packet.

* * * * *